United States Patent
Takagi et al.

(10) Patent No.: US 11,327,301 B2
(45) Date of Patent: May 10, 2022

(54) VIRTUAL IMAGE DISPLAY DEVICE

(71) Applicant: SEIKO EPSON CORPORATION, Tokyo (JP)

(72) Inventors: Masayuki Takagi, Azumino (JP); Akira Komatsu, Kamiina-gun Tatsuno-machi (JP); Takashi Takeda, Suwa (JP); Toshiaki Miyao, Matsumoto (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 237 days.

(21) Appl. No.: 16/533,136

(22) Filed: Aug. 6, 2019

(65) Prior Publication Data
US 2020/0041785 A1 Feb. 6, 2020

(30) Foreign Application Priority Data
Aug. 6, 2018 (JP) .............................. JP2018-147432

(51) Int. Cl.
*G02B 27/00* (2006.01)
*G02B 3/00* (2006.01)
(Continued)

(52) U.S. Cl.
CPC ........... *G02B 27/0075* (2013.01); *G02B 3/00* (2013.01); *G02B 17/08* (2013.01); *G02B 27/286* (2013.01);
(Continued)

(58) Field of Classification Search
CPC .... G02B 27/0075; G02B 3/00; G02B 27/286; G02B 17/08; G02B 27/288;
(Continued)

(56) References Cited

U.S. PATENT DOCUMENTS 5,644,436 A * 7/1997 Togino .................. G02B 13/18
359/730
5,715,023 A * 2/1998 Hoppe ................. G02B 5/3016
349/11

(Continued)

FOREIGN PATENT DOCUMENTS

| CN | 202306002 U | 7/2012 |
| CN | 204705764 U | 10/2015 |
| JP | H08-327940 A | 12/1996 |

OTHER PUBLICATIONS

Wikipedia page "Index-matching material" (Year: 2018).*
Norland Products "Norland Optical Adhesive 61 Product Sheet" (Year: 2003).*

*Primary Examiner* — George G. King
(74) *Attorney, Agent, or Firm* — Oliff PLC

(57) ABSTRACT

A virtual image display device includes an image element configured to display an image, a first lens disposed in an extraction position of image light and including at the image element side thereof a convex surface, a second lens disposed further toward the image element side than the first lens and including a concave surface bonded to the convex surface of the first lens, a half mirror provided in a bonding portion for bonding together the convex surface and the concave surface, a transmission/reflection selection member provided at a light emitting side of the first lens and configured to selectively perform transmission or reflection of the light depending on a polarization state of the light, and a light-guiding portion keeping close contact between the image element and the second lens and configured to guide the image light.

9 Claims, 14 Drawing Sheets

(51) Int. Cl.
*G02B 17/08* (2006.01)
*G02B 27/28* (2006.01)

(52) U.S. Cl.
CPC .... *G02B 27/288* (2013.01); *G02B 2003/0093* (2013.01)

(58) Field of Classification Search
CPC .......... G02B 2003/0093; G02B 17/086; G02B 27/283; G02B 27/0172
See application file for complete search history.

(56) References Cited

U.S. PATENT DOCUMENTS

| | | | |
|---|---|---|---|
| 5,801,885 A | 9/1998 | Togino | |
| 5,953,137 A * | 9/1999 | Sirat | G03H 1/06 359/30 |
| 6,094,242 A | 7/2000 | Yamanaka | |
| 6,229,934 B1 * | 5/2001 | Melman | G02B 6/2848 359/247 |
| 6,304,303 B1 | 10/2001 | Yamanaka | |
| 10,606,095 B2 * | 3/2020 | Takagi | G02B 27/28 |
| 10,627,644 B2 * | 4/2020 | Takagi | G02B 27/0172 |
| 2004/0014504 A1 * | 1/2004 | Coates | G02B 27/022 455/566 |
| 2015/0309313 A1 * | 10/2015 | Border | G06K 9/00604 359/630 |
| 2016/0116748 A1 * | 4/2016 | Carollo | G02B 27/0172 345/8 |
| 2016/0286210 A1 * | 9/2016 | Border | H04N 9/3185 |
| 2018/0031835 A1 * | 2/2018 | Hoppe | G02F 1/13363 |
| 2019/0235145 A1 * | 8/2019 | Sharp | G02B 27/0977 |
| 2020/0096780 A1 * | 3/2020 | Ouderkirk | G02B 17/0856 |
| 2020/0264386 A1 * | 8/2020 | Hodge | G02B 6/3839 |

* cited by examiner

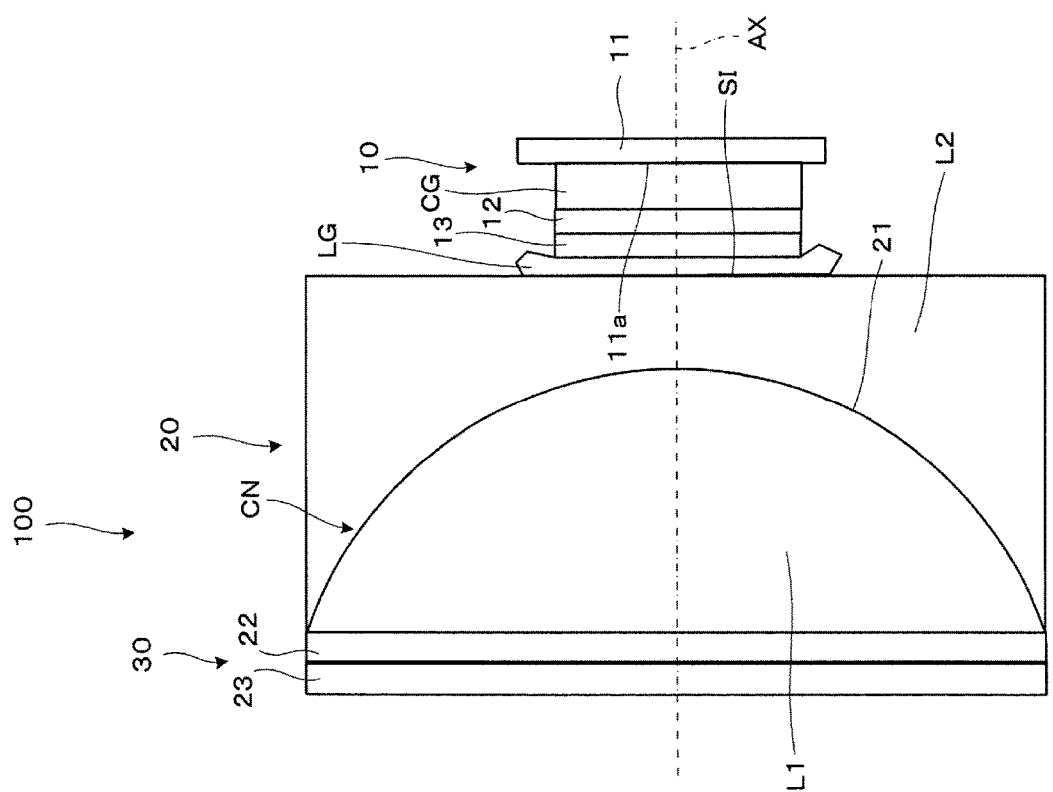
FIG. 1
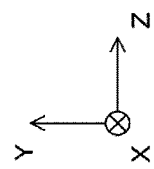

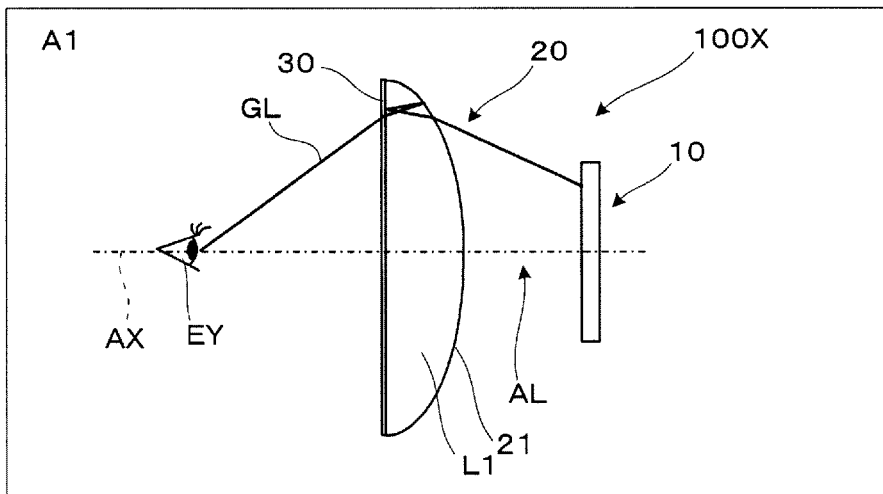
FIG. 6A1
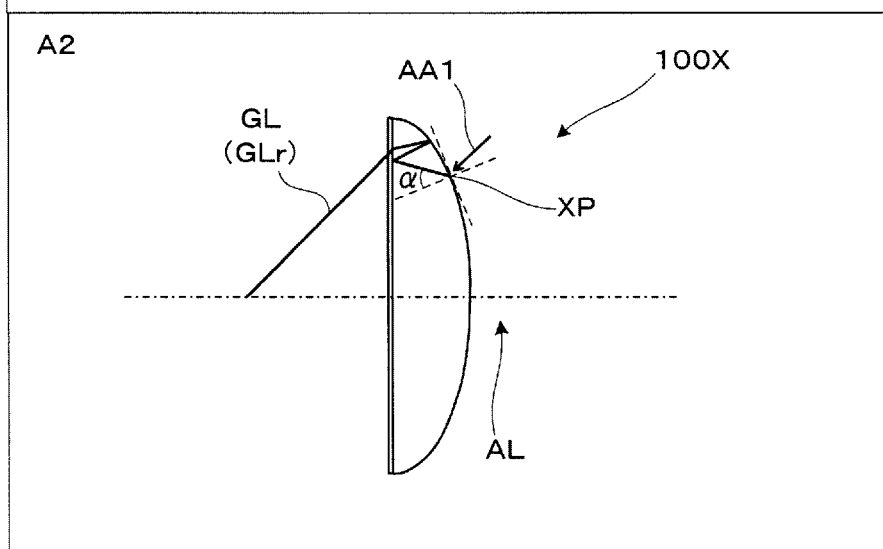
FIG. 6A2
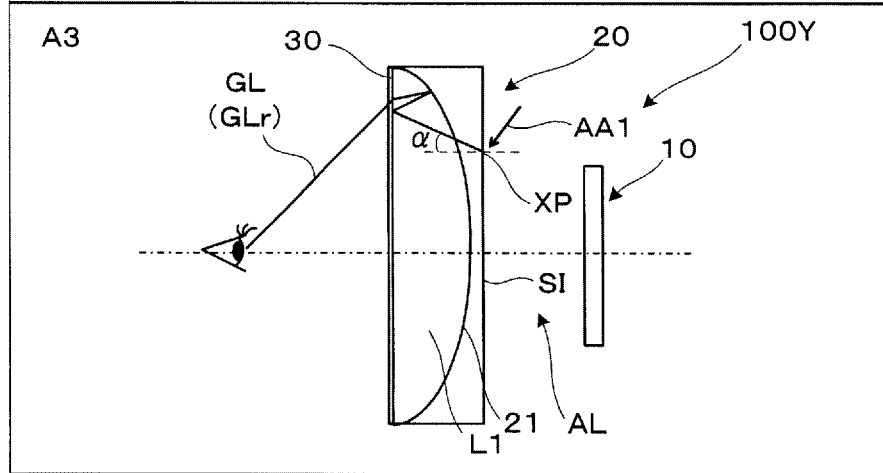
FIG. 6A3

VIRTUAL IMAGE DISPLAY DEVICE

The present application is based on, and claims priority from JP Application Serial Number 2018-147432, filed Aug. 6, 2018, the disclosure of which is hereby incorporated by reference herein in its entirety.

BACKGROUND

1. Technical Field

The present disclosure relates to a virtual image display device.

2. Related Art

As a virtual image display device or a head-mounted type display device such as a head-mounted display to be mounted on the head of an observer, for example, as described in JP-A-8-327940, a closed type with a wide visual field that achieves a thin optical system with a wide angle of view by providing a partial optical folding portion utilizing a half mirror has been known. Note that, the head-mounted display is also described as an HMD in the following.

However, in the HMD, attempting reduction in size or thickness of a device and implementing a thin optical system with a wide angle of view at the same time may lead to a problem of a restriction by a total reflection condition on a light incident angle of the optical system.

SUMMARY

A virtual image display device according to an aspect of the present disclosure includes an image element configured to display an image, a first lens disposed in an extracting position of image light and including, at the image element side thereof, a convex surface, a second lens disposed further toward the image element side than the first lens and including a concave surface bonded to the convex surface of the first lens, a half mirror provided in a bonding portion for bonding together the convex surface and the concave surface, a transmission/reflection selection member provided at a light emitting side of the first lens and configured to selectively perform transmission or reflection of the light, depending on a polarization state of the light, and a light-guiding portion keeping close contact between the image element and the second lens and configured to guide the image light.

BRIEF DESCRIPTION OF THE DRAWINGS

FIG. 1 is a side cross-sectional view for conceptually explaining a virtual image display device according to First Exemplary Embodiment.

FIGS. 6A1 to 6A3 illustrate ray diagrams for explaining virtual image display devices according to comparative examples.

DESCRIPTION OF EXEMPLARY EMBODIMENTS

First Exemplary Embodiment

A virtual image display device according to First Exemplary Embodiment of the present disclosure will be described below in detail with reference to FIG. 1 and the like.

Figure 2:
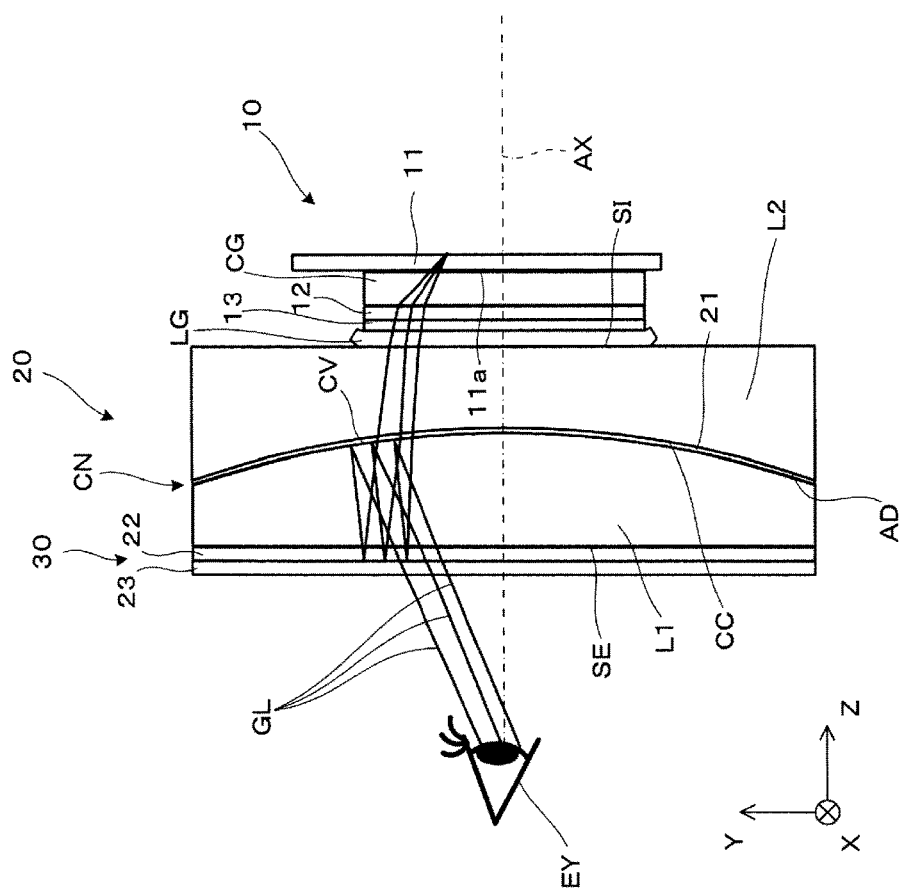
FIG. 2 illustrates a side cross-sectional view for conceptually explaining an optical path of image light in a configuration example of the virtual image display device.

As conceptually illustrated in FIG. 1 and FIG. 2, a virtual image display device 100 of this exemplary embodiment includes an image display device 10 as an image element (image display unit), an enlargement optical system 20, and a light-guiding portion LG provided between the image display device 10 and the enlargement optical system 20, and serves as a virtual image display device capable of causing an observer or a user wearing the virtual image display device 100 to visually recognize imaging light (image light) by a virtual image, that is, a head-mounted display (HMD). Here, FIG. 1 conceptually illustrates a state of a cross section when viewed from a side in the case where the observer wears the virtual image display device 100. In FIG. 1 and the like, an optical axis AX of the optical system of the virtual image display device 100 is a Z direction. Additionally, among in-plane directions of a surface orthogonal to the Z direction, a horizontal direction that is a right-left direction is an X direction, and among the in-plane directions, a direction orthogonal to the X direction is a Y direction. In this case, a horizontal direction assumed to be a direction in which the right and left eyes of the observer are aligned is the X direction. Then, an up-down direction for the observer which is a direction orthogonal to the horizontal direction is a vertical direction and, in FIG. 1 and the like, is the Y direction. Additionally, in FIG. 2, a position of an eye EY of the observer, in a configuration of the virtual image display device 100, is a position of the pupil assumed as a location on which the eye EY of the observer exists.

Note that, the image display device 10, the enlargement optical system 20, and the light-guiding portion LG are prepared for each of the right eye and the left eye and are configured as a right-left pair. However, here, since a configuration of a left side and a configuration of a right side are symmetric, only one side (for the left eye) of the left and right sides is illustrated, and the other side is omitted. For example, in FIG. 2, there is an ear in the +X direction from the eye EY of the observer, and there is a nose in the −X direction. Note that, with only one of the right-left pair, the virtual image display device 100 can function as the virtual image display device without using the other one of the pair. Further, the virtual image display device can also be configured for a single eye without the right-left pair configuration.

An example of a configuration and the like of each of units for guiding image light by the virtual image display device 100 will be conceptually explained below.

First, the image display device 10 includes a panel unit 11 being a main body part to form an image and configured to emit image light GL, a cover glass CG for covering a light-emitting surface 11a of the panel unit 11, a polarization plate 12, and an incident side polarization conversion member 13. Here, as the image display device 10, a small one is adopted and, as in the illustration, the image display device 10 is configured, at least, to be smaller than the enlargement optical system 20, with respect to a direction orthogonal to the optical axis AX. Specifically, for example, in the example in the illustration, it is obvious that a size of an image display area of the image display device 10 is smaller than a size of an optical surface of a second lens L2 of the enlargement optical system 20 described later.

The panel unit 11 serving as a display device can be an image element (image display element) configured of a light-emitting type element (organic light-emitting diode (OLED)), such as organic electroluminescence (EL), for example. In addition to the organic EL, the panel unit 11 may be, for example, a light-emitting type display element represented by an inorganic EL, a light-emitting diode (LED) array, an organic LED, a laser array, a quantum dot light-emitting type element, or the like. The panel unit 11 forms a colored still image or video on the light-emitting surface 11a, which is two-dimensional. The panel unit 11 is driven by a drive control circuit (not illustrated) to perform display operations. When an organic EL display is used as the panel unit 11, the configuration is provided with an organic EL control unit. When a quantum dot display is used as the panel unit 11, the configuration is that the light of a blue light-emitting diode is passed through the quantum dot film to produce a green or red color. The panel unit 11 is not limited to the light-emitting type display element, and may be configured by an LCD or another light-modulating element, and form an image by illuminating the light-modulating element with a light source such as a backlight. As the panel unit 11, a liquid crystal on silicon (LCoS; trade name), a digital micromirror device, or the like may be used instead of an LCD.

Here, from a viewpoint of definition enhancement or the like, as an image element used for the panel unit 11 of the image display device 10, for example, a case is conceivable in which a small one such as a micro display is desirably adopted. In order to achieve the definition enhancement, for example, a liquid crystal panel using a high-temperature polycrystalline silicon (HTPS) or silicon (Si) backplane, or an OLED panel needs to be applied, because there is proportional relation between a panel size and a panel unit price for each of these panels. That is, from a practical viewpoint of reducing product costs or the like, a smaller panel needs to be applied. However, when reducing a panel in size is attempted and, at the same time, an angle of view is widened, that is, when applying a smaller panel size is attempted, a focal distance of an optical system also needs to be reduced. That is, a curvature radius of a lens needs to be reduced. In this case, in a component of light on a wide visual field angle side, due to a restriction of a total reflection condition on a lens surface, a shape with strong curvature cannot be adopted, thus desirable reduction in panel size is not possibly achieved. In the virtual image display device 100 of the exemplary embodiment, in view of the above-described conditions, reduction of the panel unit 11 in size is achieved.

The polarization plate 12 is adhered to the light-emitting surface of the cover glass CG. The polarization plate 12 is a transmissive type polarization plate, and is a member for extracting a linearly polarized light component of the image light GL when the image light GL passes through from the panel unit 11.

The incident side polarization conversion member 13 is adhered to the light-emitting surface of the polarization plate 12. The incident side polarization conversion member 13 is a quarter wavelength plate, that is, a λ/4 plate, and converts a polarized state of passing light. That is, the incident side polarization conversion member 13 is positioned on an optical path downstream of the polarization plate 12, and converts the image light GL converted to the linearly polarized light by passing through the polarization plate 12 to circularly polarized light. In addition, as illustrated, the incident side polarization conversion member 13 is a member positioned furthest downstream in the optical path of the image display device 10, that is, positioned near the enlargement optical system 20, and is adhered to the enlargement optical system 20 via the light-guiding portion LG.

Next, the light-guiding portion LG is provided between the image display device 10 and the enlargement optical system 20, and guides the image light GL while keeping close contact between the image display device 10 and the enlargement optical system 20. In other words, the image display device 10 and the enlargement optical system 20 are bonded so that an air gap is not provided in guiding the light. More specifically, here, the "keeping close contact" in the light-guiding portion LG means that no unintended air layer or the like, which would impact the guiding of the image light GL, is formed at an interface between the light-guiding portion LG and the image display device 10 or the enlargement optical system 20, or an interior of the light-guiding portion LG, and also means that no gap exits to such an extent that an optical path, which is assumed on the basis of a refractive index or the like specific to the material of each light guiding member, can be maintained in a state that would cause the image light GL to pass through. Further, here, the light-guiding portion LG is an adhesion portion that keeps close contact between the incident-side polarization conversion member 13 of the image display device 10 positioned furthest downstream in the optical path, that is, in a position closest to the enlargement optical system 20, and the second lens L2 of the enlargement optical system 20 positioned furthest upstream in the optical path, that is, closest to the image display device 10. The light-guiding portion LG, which is the adhesion portion, is configured by forming a light-guiding layer by providing an adhesive having sufficiently high optical transparency in the form of a layer and solidifying the adhesive. Note that, though various types of adhesives are applicable as the material constituting the light-guiding portion LG, a material having a transmittance of 1.3 or greater is used here. Further, it is conceivable to apply an adhesive that solidifies by heat curing or ultraviolet (UV) curing. That is, the light-guiding portion LG is formed by an adhesion portion obtained by solidifying an adhesive by heat treatment or UV irradiation.

Figure 3:
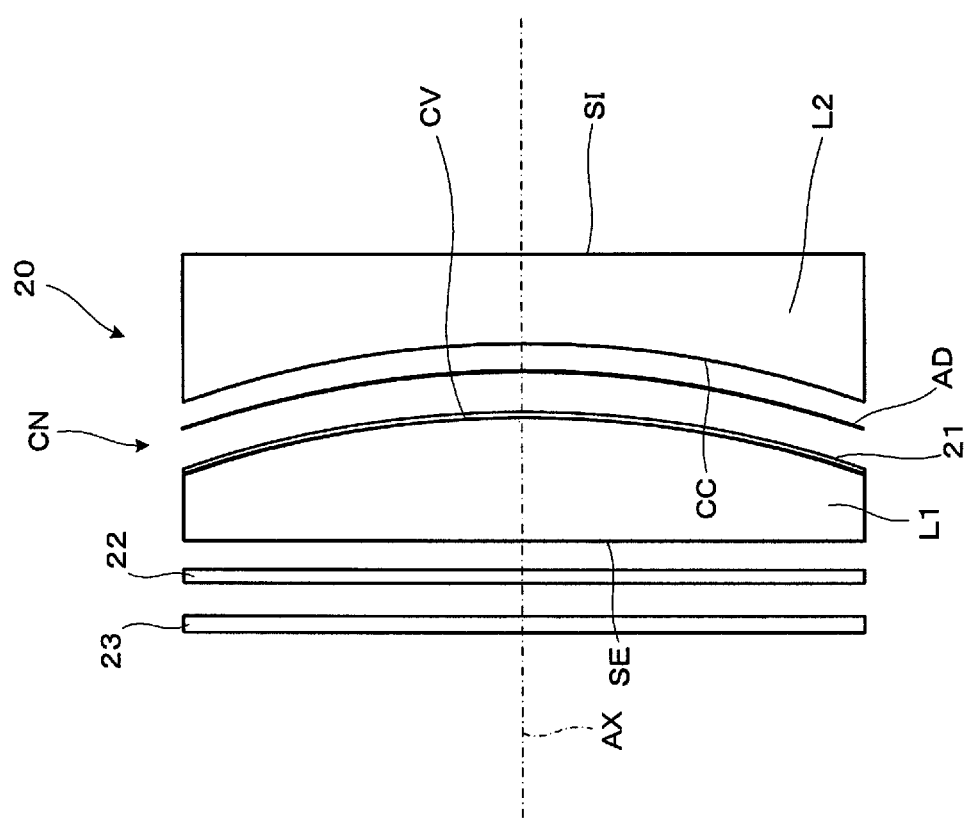
FIG. 3 is an exploded view for explaining a configuration of an enlargement optical system.

Next, as illustrated in FIG. 3, which is an exploded view of the configuration example of FIG. 2, in addition to FIG. 1 and FIG. 2, the enlargement optical system 20 includes, in addition to the two lenses, a first lens L1 and the second lens L2, bonded in order from an observer side, a half mirror 21 in a bonding location between the first lens L1 and the second lens L2, and a transmission/reflection selection member 30 on a light emitting side. Further, the transmission/reflection selection member 30 is configured with an emitting side polarization conversion member 22, and a semi-transmissive reflection type polarization plate 23. Note that each of the first lens L1 and the second lens L2 is a glass lens.

First, the first lens L1 is a planoconvex lens disposed in an extracting position for extracting the image light GL to an outside of a device, of the lenses configuring the enlargement optical system 20, in a front-of-eye side of the observer, that is, in a −Z side near the eye EY, includes a light-emitting plane SE being a flat surface as a light-emitting surface on the front-of-eye side, and includes a convex surface CV on an image display device 10 side being an opposite side to the light-emitting plane SE. The first lens L1 is a highly refractive lens with a refractive index of 1.8 or larger, for example, to obtain an image with a sufficiently wide angle of view. Further, the convex surface CV is a spherical surface. That is, the first lens L1 is a spherical surface planoconvex lens.

Next, the second lens L2 is a planoconcave lens disposed closer to the image display device 10 side than the first lens L1, includes a concave surface CC on the front-of-eye side, and includes a light incident plane SI being a flat surface as a light incident surface to which the image light GL from the image display device 10 is incident on the image display device 10 side being an opposite side to the concave surface CC. A refractive index of the second lens L2 is equal to a refractive index of the first lens L1, or is smaller than the refractive index of the first lens L1. Further, the concave surface CC includes a spherical surface with a curved surface shape corresponding to the convex surface CV of the first lens L1. That is, the second lens L2 is a spherical surface planoconcave lens.

The first lens L1 and the second lens L2 are bonded at the convex surface CV and the concave surface CC, and form a bonding portion CN.

Additionally, both the light-emitting plane SE and the light incident plane SI are parallel to the light-emitting surface 11a of the image display device 10 and, in the example in the illustration, are parallel to an XY plane. Note that, as a tolerance of parallelism in this instance, for example, within ±2° is conceivable. Of these planes SE and SI, the light incident plane SI, in particular, is a plane positioned closest to the optical path upstream of the second lens L2, that is, to the image display device 10 of the enlargement optical system 20, and is adhered to the image display device 10 in a state of being kept in close contact by the light-guiding portion LG, which is the adhesion portion.

The half mirror 21 is a semi-reflective and semi-transmissive film for transmitting part of image light and reflecting another part of the image light, and is formed with a dielectric multilayer film, a metal film, and the like, for example. As in the illustration, the half mirror 21 is formed between the first lens L1 and the second lens L2. That is, the half mirror 21 is provided in the bonding portion CN. Thus, the half mirror 21 is formed in a concavely curved surface shape when viewed from the observer side.

Here, an example of forming the half mirror 21 or the bonding portion CN will be described. As an example of a configuration of the enlargement optical system 20 illustrated in an exploded view in FIG. 3, firstly, a film to be the half mirror 21 is formed on the convex surface CV of the first lens L1 by vapor deposition. Next, the formed film of the half mirror 21 and the concave surface CC of the second lens L2 are adhered by an adhesive, and this adhesive cures to form an adhesive film AD, thus the bonding portion CN is formed. Note that, although details will be described later, by providing the adhesive film AD not on a first lens L1 side, but on a second lens L2 side, the number of passages through the adhesive film AD can be reduced when the image light GL passes through the enlargement optical system 20.

The transmission/reflection selection member 30 is, as described above, configured with the emitting side polarization conversion member 22, and the semi-transmissive reflection type polarization plate 23, and selectively performs transmission or reflection according to a polarized state of light.

The emitting side polarization conversion member 22 of the transmission/reflection selection member 30 is the quarter wavelength plate, that is, the λ/4 plate, and converts a polarized state of passing light. As in the illustration, the emitting side polarization conversion member 22 is adhered to the light-emitting plane SE of the first lens L1, and is provided between the first lens L1 and the semi-transmissive reflection type polarization plate 23. The emitting side polarization conversion member 22 converts a polarized state of a component traveling back and forth between the semi-transmissive reflection type polarization plate 23 and the half mirror 21. Here, the polarization conversion member 22 being the quarter wavelength plate converts the image light GL that is in the circularly polarized state to the linearly polarized light, or, conversely, converts the image light GL that is in the linearly polarized state to the circularly polarized light.

The semi-transmissive reflection type polarization plate 23 of the transmission/reflection selection member 30 is adhered to the light-emitting plane SE via the emitting side polarization conversion member 22. That is, the semi-transmissive reflection type polarization plate 23 is a member disposed on a side closest to a position of the pupil assumed as a position of the eye EY of the observer, and emits the image light GL toward the front-of-eye side of the observer. In this case, the semi-transmissive reflection type polarization plate 23 is configured with a reflective type wire grid polarization plate. That is, the semi-transmissive reflection type polarization plate 23 changes a transmission/reflection characteristic depending on whether a polarized state of an incident component is in a polarization transmission axis direction. In this case, since the emitting side polarization conversion member 22 is disposed on an optical path upstream of the semi-transmissive reflection type polarization plate 23, a polarized state of light changes each time the light passes through the emitting side polarization conversion member 22, and the semi-transmissive reflection type polarization plate 23 transmits or reflects the incident component according to the change. Here, as an example, a horizontal direction (the X direction) assumed as a direction in which the eyes of the observer are arranged is the polarization transmission axis direction. Note that the semi-transmissive reflection type polarization plate 23 configured with the reflection type wire grid polarization plate changes the transmission/reflection characteristic in accordance with the polarized state of the incident component, thus may also be referred to as a reflection type polarization plate.

The transmission/reflection selection member 30 is, as described above, configured with the emitting side polarization conversion member 22, and the semi-transmissive reflection type polarization plate 23, thus can change a polarized state of light and according to the change, selectively transmit or reflect the light.

As described above, in the exemplary embodiment, the enlargement optical system 20 is configured with two lenses being main parts of an optical system, these lenses are bonded and configured not to provide an air space, and each of the light incident plane SI and the light-emitting plane SE being a surface of the lens is a flat surface. Thus, especially, the virtual image display device 100 can be shortened along an optical axis direction, and can be reduced in size or thickness. Additionally, since each of the light incident plane SI and the light-emitting plane SE is the flat surface, as described above, on these planes, the polarization plate, the quarter wavelength plate, the reflection type wire grid polarization plate, and the like can be directly and easily adhered as various optical sheets, thus reduction of the number of components, reduction of optical components in size, and performance improvement are enabled.

An optical path of the image light GL will be briefly described below with reference to FIG. 1. First, the image light GL modulated in the panel unit 11 of the image display device 10 is converted to linearly polarized light in the polarization plate 12 serving as a transmissive type polarization plate. Here, a polarization direction of the linearly polarized light after passing through the polarization plate 12 is a first direction. The image light GL, after converted to the linearly polarized light in the first direction by the polarization plate 12, is converted to circularly polarized light by the incident side polarization conversion member 13 being a first quarter wavelength plate, and is emitted toward the enlargement optical system 20 through the light-guiding portion LG.

The emitted image light GL is incident on the second lens L2 from the light incident plane SI positioned closest to the image display device 10 side of the enlargement optical system 20. Subsequently, the image light GL reaches an interface between the second lens L2 and the first lens L1, that is, the half mirror 21 provided in the bonding portion CN. Of the image light GL, some components pass through the half mirror 21, and are converted to linearly polarized light by the emitting side polarization conversion member 22 that is a second quarter wavelength plate. Here, since the linearly polarized light, after passing through the polarization plate 12, passes through the quarter wavelength plate twice, the polarization direction is a different direction with respect to the first direction by 90°. Here, this is a second direction. The image light GL, after converted to the linearly polarized light in the second direction by the emitting side polarization conversion member 22, reaches the semi-transmissive reflection type polarization plate 23 or a reflection type polarization plate.

Here, the semi-transmissive reflection type polarization plate 23 is set to transmit linearly polarized light in the first direction, and reflect linearly polarized light in the second direction. From another perspective, a transmission characteristic of the polarization plate 12 or a transmission/reflection selection characteristic of the semi-transmissive reflection type polarization plate 23 is configured as such. In this case, the image light GL being the linearly polarized light in the second direction is reflected by the semi-transmissive reflection type polarization plate 23, once more becomes the circularly polarized light at the emitting side polarization conversion member 22 being the quarter wavelength plate, and reaches the half mirror 21. At the half mirror 21, some components of the image light GL pass through as they are, but remaining components are reflected, and the components of the reflected image light GL this time are converted to the linearly polarized light in the first direction by the emitting side polarization conversion member 22 being the quarter wavelength plate. The components of the image light GL converted to the linearly polarized light in the first direction pass through the semi-transmissive reflection type polarization plate 23, and the image light GL reaches the position of the pupil assumed as the location on which the eye EY of the observer exists.

Note that, as described above, the half mirror 21 is configured by being vapor-deposited on the first lens L1 side, and subsequently by being adhered and fixed to the second lens L2 via the adhesive film AD. Accordingly, the image light GL, in the above optical path, after reflected by the semi-transmissive reflection type polarization plate 23, does not pass through the adhesive film AD, but is reflected by the half mirror 21. That is, the image light GL passes through the adhesive film AD only once when passing through the area between the first lens L1 and the second lens L2 for the first time in this configuration. As described above, by reducing the number of passages through the adhesive film AD as far as possible, reduction in component amounts and deterioration of the image light GL are suppressed.

As described above, in the enlargement optical system 20 in the virtual image display device 100 of the exemplary embodiment, the half mirror 21 and the transmission/reflection selection member 30 can fold the optical path of the image light GL, and the image light GL can have a wide angle of view by utilizing the reflection at the half mirror 21 provided on the curved surface, and the like.

Note that, in the above, the light incident plane SI and the light-emitting plane SE of the two lenses L1 and L2 in the enlargement optical system 20 are the flat surfaces. Accordingly, a portion of curved surface parts, on which the two lenses L1 and L2 are bonded, is in charge of optical path adjustment for each pencil of rays configuring the image light GL. That is, a reflection action at the half mirror 21 formed on this surface, and a refraction action due to a refractive index difference or the like between the two lenses L1 and L2 adjust the optical path. For the two lenses L1 and L2, the enlargement optical system 20 such as that described above can be formed by using a glass material having a different refractive index and a different Abbe number.

Figure 4:
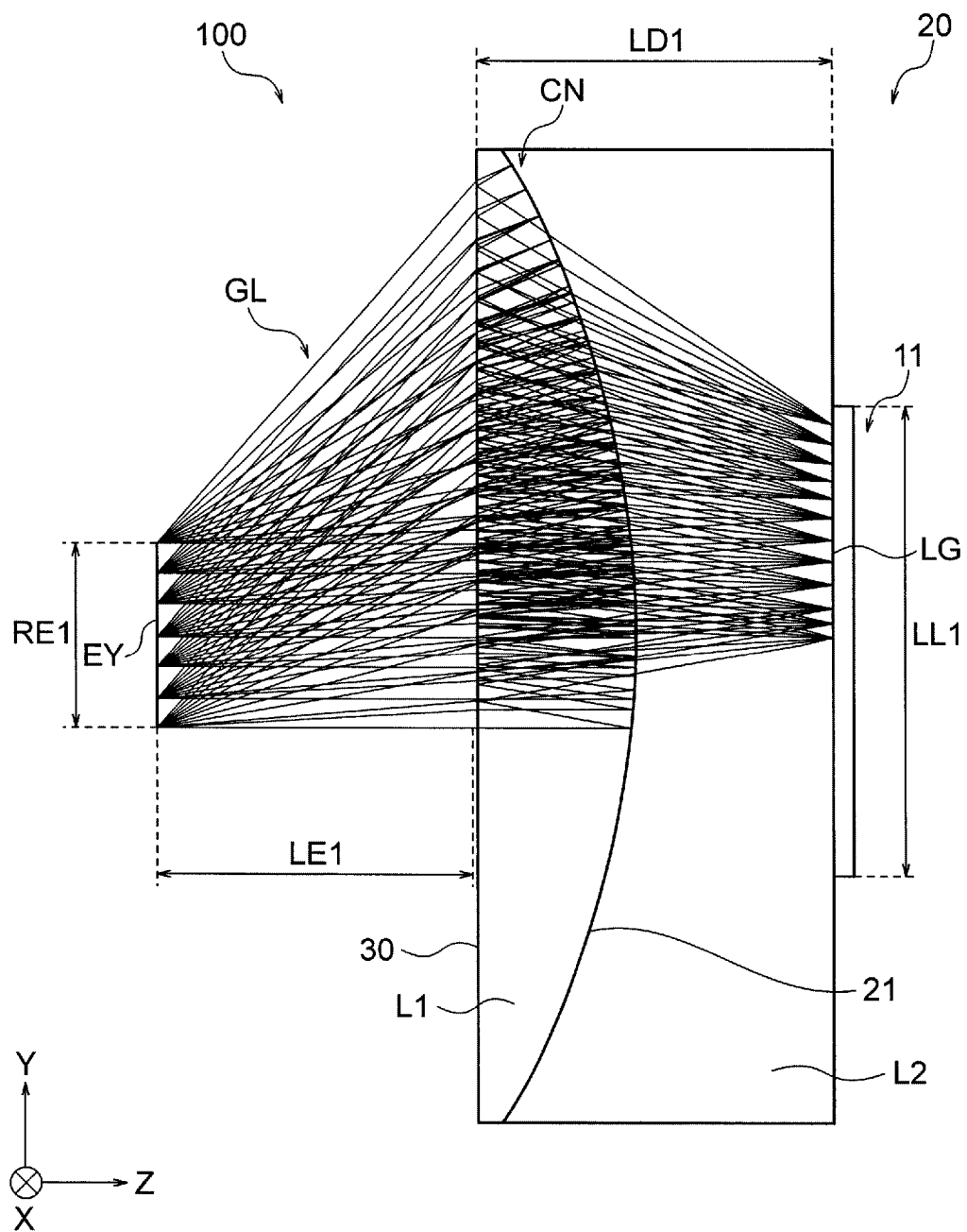
FIG. 4 is a ray diagram of an example of the virtual image display device.

Additionally, as in the example illustrated in FIG. 4, here, a length of a side of a panel size corresponding to a size of the image display area of the image display device 10 is a length LL1, an entire length of the enlargement optical system 20 in the optical axis direction is a length LD1, a length of an eye relief being a distance from the enlargement optical system 20 to the position of the eye EY is a length LE1, and a diameter of an eye ring at the position of the eye EY is a diameter RE1.

Of these, the length LL1 of the side of the panel size is preferably less than or equal to 63.5 mm (2.5 inches), further less than or equal to 25.4 mm (1 inch) (more preferably, about 12 to 13 mm) from a viewpoint of demand for reduction in size. In the exemplary embodiment, a small panel such as a micro display as the image display device 10 is used, an image by this panel is enlarged by the enlargement optical system 20, thus an image with a large angle of view can be formed.

In a virtual image display device such as an HMD, an angle of view has been widened, thus an optical system has a very short focal distance. Here, as for a field of view (FOV), a half angle of view is 50°, that is, a full angle of view is 100°. In order to satisfy the above-described conditions, the respective dimensions described above are as follows: The entire length of the enlargement optical system 20 is LD1=14 mm. The length of the eye relief is LE1=10 mm. The diameter of the eye ring is RE1=6 mm. Further, a curvature radius of a lens surface, that is, a curvature radius of each of the convex surface CV of the first lens L1 and the concave surface CC of the second lens L2 is 44.2 mm.

Additionally, in each of the above figures, since the lens surface is the spherical surface lens, a more highly refractive material can be applied. It is conceivable that, when the curvature of the lens surface can be suppressed by applying the more highly refractive material, a Petzval curvature can be suppressed, and a field curvature can also be reduced.

Figure 5:
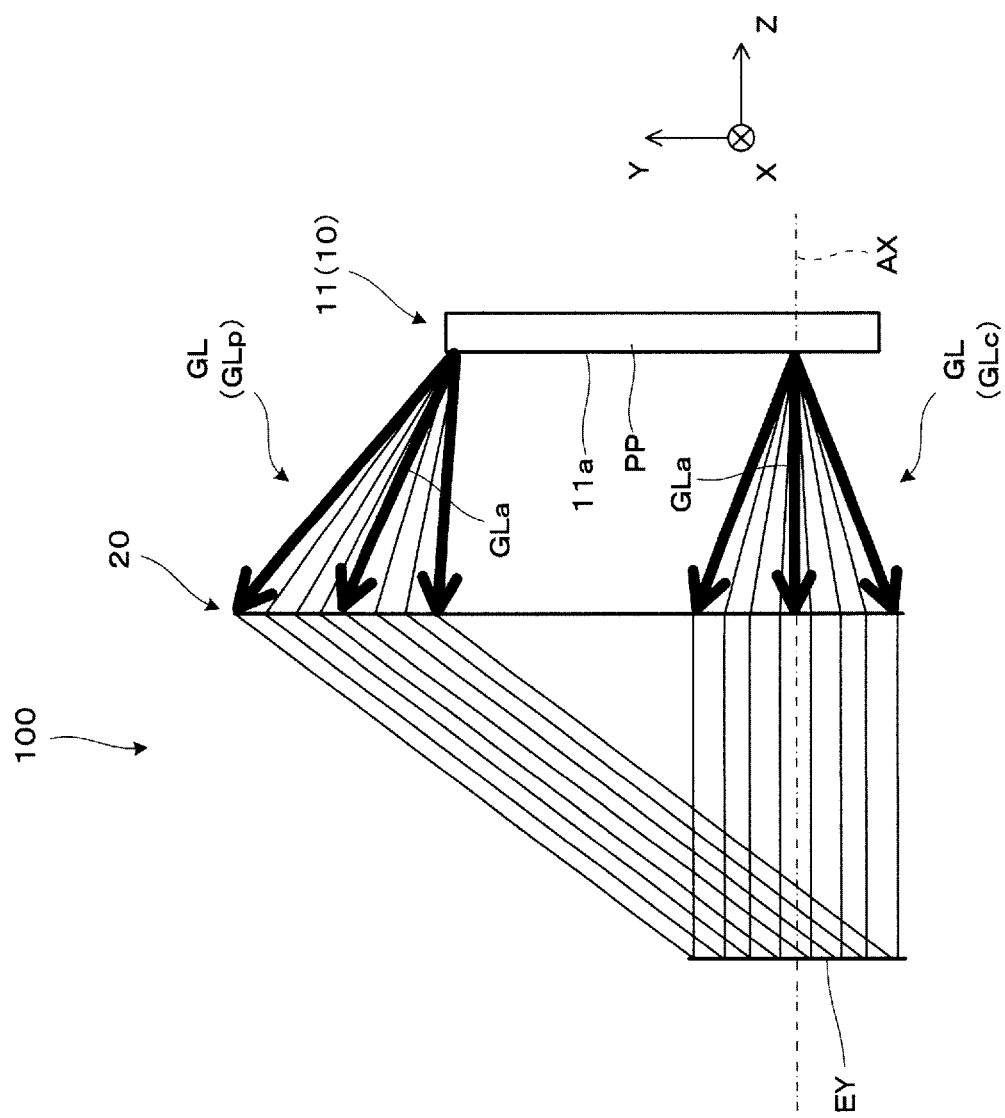
FIG. 5 is a conceptual side cross-sectional view for explaining emitted light from an image element.

An exit angle of a principal ray GLa per light emission position will be described below in relation to the image light GL as emitted light from the image display device 10, with reference to FIG. 5. Note that, in the illustration, the enlargement optical system 20 is illustrated in a simplified manner.

As described above, when a refractive power of the enlargement optical system 20 is a large optical system in order to reduce the size of the panel in the image display device 10, the system is a non-telecentric optical system in which the exit angle of the principal ray GLa is significantly inclined on the panel side, that is, the image display device 10 side, as illustrated. In other words, in the one example here, in the image light GL emitted from the image display device 10, the inclination angle of the principal ray GLa varies according to the light emission position. Specifically, of the image light GL, the principal ray GLa of a center component GLc emitted from a center position through which the optical axis AX passes is emitted in a direction perpendicular to the light-emitting surface 11a of the panel unit 11. That is, the principal ray GLa is not inclined. In contrast, of the image light GL, the principal ray GLa of a peripheral component GLp emitted from a position separated from the optical axis AX is inclined relatively to the light-emitting surface 11a.

In the exemplary embodiment, the panel unit 11 of the image display device 10 is provided with a deflecting member PP that deflects the light emission direction in accordance with the inclination angle of the principal ray GLa. As the deflecting member PP, for example, use of a microlens array, a prism array, or a diffraction element provided in each pixel is conceivable. Typically, each pixel of the panel unit 11 is designed to be emitted in a state of the highest brightness in a direction perpendicular to the light-emitting surface 11a. In contrast, in the exemplary embodiment, with provision of the deflecting member PP, the light emitted from each pixel of the panel unit 11 is deflected outward relative to the center. More specifically, the deflecting member PP deflects components emitted from the pixels outward relative to the center to the extent that the component emitted from the pixel is in a position separated from the optical axis AX. As a result, the brightness of the image across the entire image display device 10 can be secured even in a non-telecentric optical system.

Here, additional problems include matters related to a total reflection condition. With a configuration such as described above, the angle of the image light GL relative to the optical axis AX tends to be very large between the image display device 10 and the enlargement optical system 20. In particular, in order to reduce the size of a device or the like, the smaller the focal length, and the smaller the panel size of the image display device 10, the greater the angle of the image light GL is relative to the optical axis AX. In contrast, in the exemplary embodiment, the light-guiding portion LG having a refractive index corresponding to the total reflection condition is provided in a close contact state to not provide an air gap between the image display device 10 and the second lens L2, thus reliable guiding of the image light GL is maintained.

Figure 7:
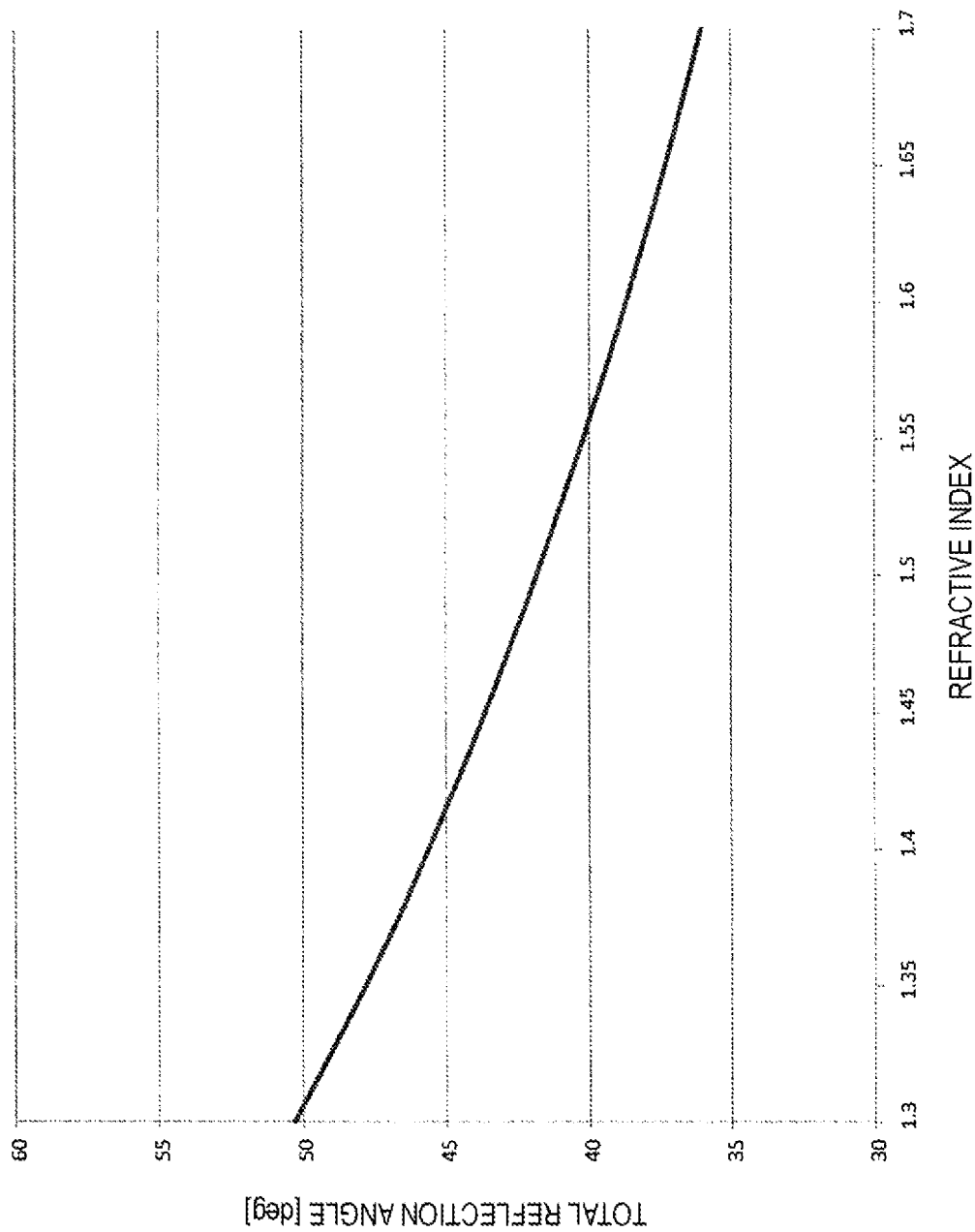
FIG. 7 is a graph for explaining a relationship between a refractive index and a total reflection condition in a comparative example.

FIGS. 6A1 to 6A3 illustrate ray diagrams of examples of virtual image display device according to comparative examples, and FIG. 7 is a graph for explaining a relationship between a refractive index and a total reflection condition in a comparative example. In the comparative example, unlike the case of the exemplary embodiment, an air gap is provided between the image display device 10 and the enlargement optical system 20. Of the comparative examples in the figure, a virtual image display device 100X illustrated in FIG. 6A1 and FIG. 6A2 includes the enlargement optical system 20 with a single lens. Specifically, each of the lens L1 in FIGS. 6A1 to 6A3 is a planoconvex lens, includes the transmission/reflection selection member 30 on a flat surface side, and includes the half mirror 21 on a convex surface side. Further, an air layer AL occurs between the image display device 10 and the enlargement optical system 20. In such a case, as illustrated in FIG. 6A1, the optical path of the image light GL is folded back at the transmission/reflection selection member 30 and the half mirror 21. However, in this case, restrictions on the total reflection condition can be problematic between the image display device 10 and the enlargement optical system 20, particularly at a boundary between the enlargement optical system 20 and the air layer AL. Specifically, when image formation similar to that of the present application is attempted on the virtual image display device 100X of the comparative example, the total reflection condition at a passing point XP at the boundary between the enlargement optical system 20 and the air layer AL indicated by the arrow AA1, for example, for the optical path of the image light GL from a position separated from the optical axis AX such as illustrated, that is, the position where the image height is greatest, for example, is problematic. That is, as illustrated in FIG. 6A2, for an optical path GLr in which the optical path of the image light GL is followed in reverse, a case may occur in which an incident angle α at the convex surface of the half mirror 21 at the passing point XP is greater than or equal to a critical angle (total reflection angle), thus light guiding is impossible. In this case, the area between the image display device 10 and the enlargement optical system 20 needs to be made larger or the size of the image display device 10 needs to be increased, resulting in the likelihood that a configuration targeted for miniaturization or the like can no longer be achieved.

A situation such as described above may also occur when the enlargement optical system 20 includes two lenses. Specifically, even where the enlargement optical system 20 includes the first and second lenses L1 and L2 and the like, as in a virtual image display device 100Y illustrated in the comparative example in FIG. 6A3, at the boundary between the light incident plane SI of the second lens L2 and the air layer AL, the total reflection condition for the incident angle α of the passing point XP of the optical path of the imaging light GL or the optical path GLr following this optical path in reverse may be similarly problematic.

Note that FIG. 7 is a graph illustrating the relationship between the refractive index of each lens constituting the enlargement optical system 20 and the total reflection angle (critical angle) at the boundary with the air layer AL. In this graph, the horizontal axis indicates the refractive index of the lens, and the vertical axis indicates the total reflection angle (critical angle). For example, in the image display device 10 or the panel unit 11, when the incident angle α is 43.2°, for example, for the component emitted from the position where the image height is greatest, light guiding is not possible due to the total reflection condition in case where the refractive index of the lens is 1.46 or greater.

In the exemplary embodiment, such a situation is avoided by the configuration described above. That is, by providing the light-guiding portion LG, which is optically transparent, having a higher refractive index than air between the image display device 10 and the enlargement optical system 20 in a close contact state, even where the incident angle α is 43.2° and the refractive index of the lens is 1.46 or greater as described above, for example, it is possible to reliably guide the image light GL.

Note that, for the adhesion portion constituting the light-guiding portion LG, the material having a refractive index of 1.3 or greater is used, from the perspective of being able to achieve the above-described object as well as adhesiveness, optical transparency, practicality, and the like, but a variety of materials having a refractive index that satisfies the above requirements can be applied as the material of the light-guiding portion LG. For example, a material having a refractive index matching the refractive index of the second lens L2, the cover glass CG, or the like may be selected as the light-guiding portion LG.

As described above, a virtual image display device according to the exemplary embodiment includes an image element configured to display an image, a first lens disposed in an extracting position of image light and including a convex surface on the image element side, a second lens disposed nearer to the image element side than the first lens and including a concave surface to be bonded to the convex surface of the first lens, a half mirror provided in a bonding portion between the convex surface and the concave surface, a transmission/reflection selection member provided on a light emitting side of the first lens and configured to selectively transmit or reflect the light depending on a light polarization state, and a light-guiding portion closely adhering between the image element and the second lens, and also configured to guide the image light.

In the virtual image display device described above, with the first lens and the second lens being bonded together, and the half mirror being provided in the bonding portion between the convex surface and the concave surface to achieve miniaturization or thinning, and with power being provided to form an image having a wide angle of view, it is possible to guide the image light by the light-guiding portion in accordance with a widening of the angle of view between the image element and the second lens.

Second Exemplary Embodiment

Below, an example of the virtual image display device according to Second Exemplary Embodiment will be described with reference to FIG. 8.

The virtual image display device according to this exemplary embodiment is a modified example of the virtual image display device illustrated in First Exemplary Embodiment. Excluding the light-guiding portion, the virtual image display device is the same as in First Exemplary Embodiment, thus the description of the entirety of the virtual image display device is omitted and only the structure related to the light-guiding portion will be described.

Figure 8:
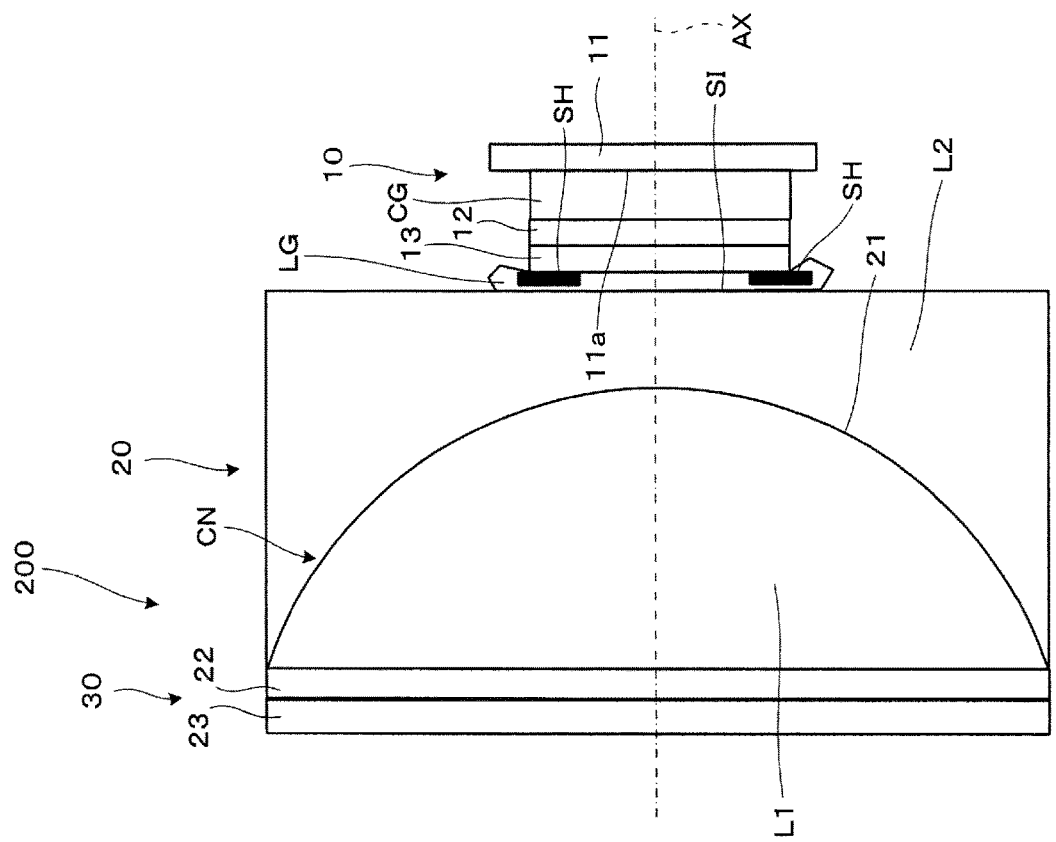
FIG. 8 is a side cross-sectional view for conceptually explaining the virtual image display device according to Second Exemplary Embodiment.

FIG. 8 is a side cross-sectional view for conceptually explaining a virtual image display device 200 according to the exemplary embodiment, and corresponds to FIG. 1.

In the virtual image display device 200 according to the exemplary embodiment, as illustrated in FIG. 8, a shielding portion SH is provided to attach along a periphery of the light-guiding portion LG.

The shielding portion SH is a member configured by, for example, black coating a sheet metal member, and is attached to surround the periphery of the light-guiding portion LG. The shielding portion SH can suppress the effects of unintentional light leakage caused by a glass member or the like constituting the virtual image display device 200. Note that the shielding portion SH can be fixed in a desired position in a state being attached to a peripheral portion surrounding the light-guiding range of the light-guiding portion by adhering the shielding portion SH together when applying the adhesive to serve as the light-guiding portion LG. Note that the above is an example and, in addition to the aspect in which black coating a sheet metal member to form the shielding portion SH as described above, the shielding portion SH is also conceivably formed by wrapping the light-guiding portion LG with a tape (black tape) having a light shielding property.

In the virtual image display device 200 of this exemplary embodiment as well, with achieving miniaturization or thinning, and with providing power to form an image having a wide angle of view, it is possible to guide the image light by the light-guiding portion LG in accordance with a widening of the angle of view between the image display device 10 and the second lens L2 of the enlargement optical system 20. In particular, in the case of this exemplary embodiment, favorable image display can be performed by reliably shielding light by the shielding portion SH.

Third Exemplary Embodiment

Below, an example of the virtual image display device according to Third Exemplary Embodiment will be described with reference to FIG. 9.

The virtual image display device according to this exemplary embodiment is a modified example of the virtual image display device illustrated in First Exemplary Embodiment and the like. Excluding the structure of attachment of the image display device including the light-guiding portion and the enlargement optical system, the virtual image display device is the same as in First Exemplary Embodiment and the like, and thus the description of the entirety of the virtual image display device is omitted and only the light-guiding portion and the structure of attachment of the image display device including the light-guiding portion and the enlargement optical system will be described.

Figure 9:
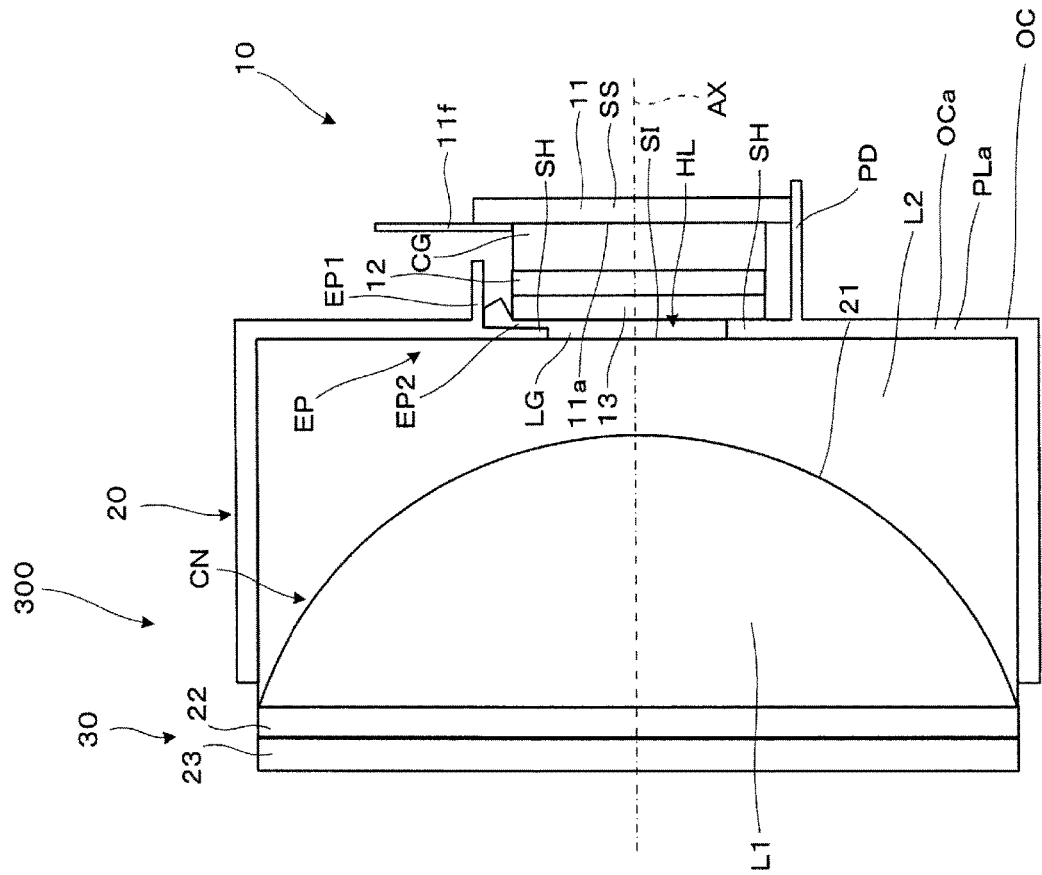
FIG. 9 is a side cross-sectional view for conceptually explaining the virtual image display device according to Third Exemplary Embodiment.

FIG. 9 is a side cross-sectional view for conceptually explaining a virtual image display device 300 according to the exemplary embodiment, and corresponds to FIG. 1 and the like.

In the virtual image display device 300 according to the exemplary embodiment, as illustrated in FIG. 9, an optical case component OC is provided around the light-guiding portion LG as a component constituting a structure of attachment of the image display device 10 and the enlargement optical system 20.

Specifically, as in the illustration, the optical case component OC is an integrally molded product including a cylindrical member with a shoulder extending along the second lens L2 of the enlargement optical system 20 as a main body portion OCa. Note that the enlargement optical system 20 is configured to further include a through-portion (through-hole) and a plate-like member in the main body portion OCa, in a center of the main body portion OCa. First, the optical case component OC forms a through-portion HL for applying adhesive to serve as the light-guiding portion LG in a center portion of a plate-like portion PLa that comes into contact with a portion of the main body portion OCa, which is an extending surface along the light incident plane SI and which is not optically functional, the component OC being formed with a portion that serves as a shielding portion SH which surrounds a periphery of the through-portion HL and suppresses unintentional light leakage.

Further, the optical case component OC includes an image element positioning portion PD, which is a plate-like member extending from a predetermined location at a lower side, i.e., the −Y side, than the through-portion HL toward the image display device 10 (in the +Z direction), of an outer surface of the plate-like portion PLa. The image display device 10 can be positioned relative to the second lens L2 by abutting one side surface of a silicon (Si) substrate SS having a rectangular shape and constituting the panel portion 11 of the image display device 10 against the image element positioning portion PD. Thus, as in the illustration, the image element positioning portion PD extends horizontally with respect to the optical axis AX direction, specifically, parallel to the XZ plane, and extends to the extent of being abutted against the Si substrate SS in the Z direction. In other words, the light-guiding portion LG and the image display device 10 have sufficient lengths in the depth direction (thickness direction).

Furthermore, the optical case component OC includes an adhesive escape portion EP. In the illustrated example, the optical case component OC forms the adhesive escape portion EP that allows an excess of the adhesive that is to form the adhesion portion, that is, the light-guiding portion LG, to escape by a plate-like member EP1 extending from a predetermined location above side, that is, on the +Y side, of the through-portion HL of the outer surface of the plate portion PLa toward the image display device 10 (in the +Z direction), and a cutout portion EP2 obtained by cutting (machining) the shielding portion SH to a degree that does not affect a performance maintainability of shielding.

The attachment between the image display device 10 and the enlargement optical system 20 using the optical case component OC will be simply described below. As a premise, the optical case component OC is attached to the enlargement optical system 20, and then the image display device 10 is attached to the optical case component OC, so that the image display device 10 and the enlargement optical system 20 are attached and the light-guiding portion LG is provided between the image display device 10 and the enlargement optical system 20.

To explain attachment in more detail on the basis of the above, in the optical case component OC attached to the enlargement optical system 20, an adhesive that is to serve as the light-guiding portion LG is first applied to the through-portion HL. Next, in the panel portion 11 of the image display device 10, among the side surfaces of the rectangular Si substrate SS, a side surface opposite the side surface, on which a flexible printed cable (FPC) portion 11f is provided, is adhered with the adhesive in close contact from below (−Y side) the incident side polarization conversion member 13 while being abutted against and aligned with the image element positioning portion PD. As a result, the adhesive gradually rises upward (on +Y side), and the excess portion of the adhesive passes through the cutout portion EP2 and protrudes into the adhesive escape portion EP, which is a space for a liquid pool formed by the plate-like member EP1 and the cutout portion EP2. Subsequently, the adhesive is solidified by heat curing or UV curing, affixing the image display device 10 to the optical case component OC, thus the image display device 10 and the enlargement optical system 20 are attached in an accurately positioned state. Further, in this case, in order to closely adhere the image display device 10 and the enlargement optical system 20, and form the light-guiding portion LG without forming an air layer or the like, assembly can be performed in a state with a sufficient amount of the adhesive being applied to the location where the light-guiding portion LG is to be formed. Note that the adhesive escape portion EP is given a sufficient size and shape for preventing unintended locations from being adhered by the excess adhesive, taking into consideration the amount of excess adhesive, the fluidity of the adhesive, and the like. That is, the desired adhesive escape portion EP is formed by adjusting the position, the size, and the shape of the plate-like member EP1 and the cutout portion EP2.

In the virtual image display device 300 of the exemplary embodiment as well, with achieving miniaturization or thinning, and with providing power to form an image having a wide angle of view, it is possible to guide the image light by the light-guiding portion LG in accordance with a widening of the angle of view between the image display device 10 and the second lens L2 of the enlargement optical system 20. In particular, in the exemplary embodiment, the optical case component OC enables reliable attachment between the image display device 10 and the enlargement optical system 20.

Fourth Exemplary Embodiment

An example of the virtual image display device according to Fourth Exemplary Embodiment will be described below with reference to FIG. 10 and FIG. 11.

The virtual image display device according to this exemplary embodiment is a modified example of the virtual image display device illustrated in First Exemplary Embodiment and the like. Excluding the provision of an embedding portion serving as the structure of attachment of the image display device including the light-guiding portion with the enlargement optical system, the virtual image display device is the same as in First Exemplary Embodiment and the like, thus the description of the entirety of the virtual image display device is omitted and only the structure related to the embedding unit will be described.

Figure 10:
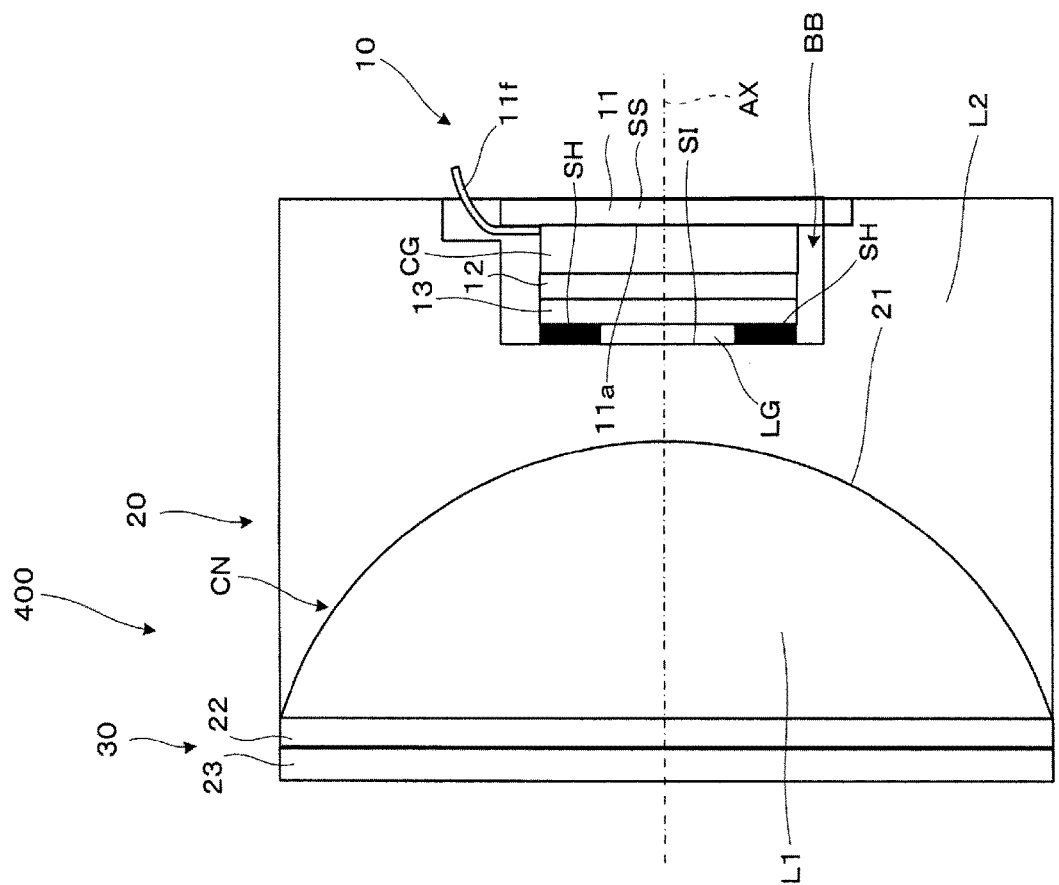
FIG. 10 is a side cross-sectional view for conceptually explaining a virtual image display device according to Fourth Exemplary Embodiment.
Figure 11:
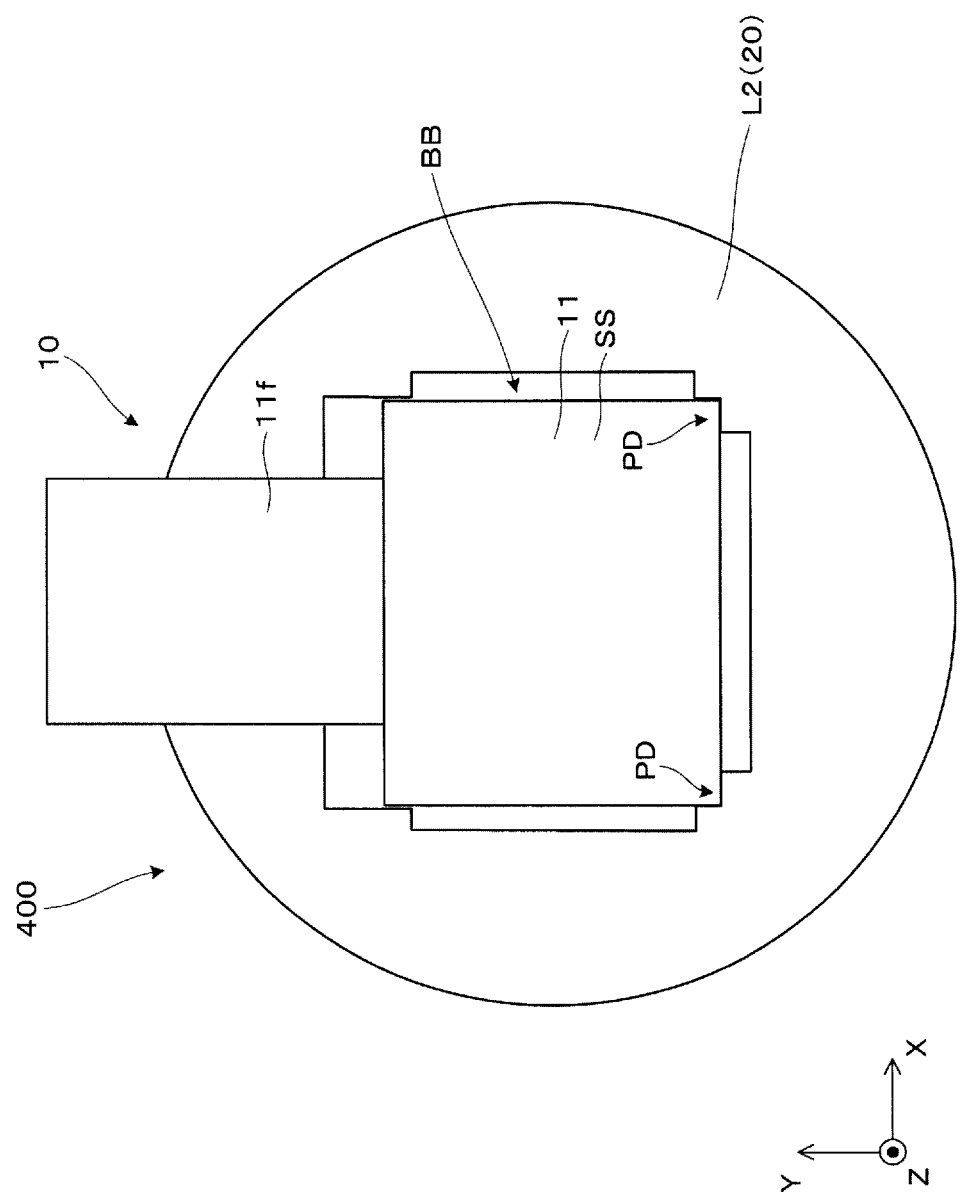
FIG. 11 is a rear view for conceptually explaining the virtual image display device according to Fourth Exemplary Embodiment.

FIG. 10 and FIG. 11 are a side cross-sectional view and a rear view for conceptually explaining a virtual image display device 400 according to the exemplary embodiment. Note that FIG. 10 is a figure corresponding to FIG. 1 and the like.

In the virtual image display device 400 of the exemplary embodiment, as illustrated in FIG. 10 and FIG. 11, an embedding portion BB, in which the image display device 10 is embedded, is provided in the second lens L2 of the enlargement optical system 20. More specifically, in the exemplary embodiment, in a center portion of a surface of the second lens L2 on the side facing the image display device 10, a concave portion having a rectangular shape and aligned with the image display device 10 is provided as an embedding portion BB, and the light incident plane SI is formed on a bottom surface of the convex portion serving as the embedding portion BB. Furthermore, as illustrated in FIG. 11, a stepped portion is provided on a front surface side (+Z side) of the embedding portion BB and, as illustrated, a portion on a lower side (−Y side) of the embedding portion BB function as the image element positioning portion PD configured to abut against the rectangular Si substrate SS constituting the panel portion 11 of the image display device 10 and position the image display device 10 relative to the second lens L2. In addition, a space for drawing out the FPC unit 11f is formed on an upper side (+Y side) of the embedding portion BB. Note that, as illustrated, the shielding portion SH can be provided to attach along with the periphery of the light-guiding portion LG in this exemplary embodiment as well. Though various aspects are assumed for the embedding portion BB in terms of size, such as depth, and shape, it is conceivable that the abutting locations with the Si substrate SS are set to a depth corresponding to a thickness of the Si substrate SS, making it possible to position such a Si substrate SS in a state abutted against the embedding portion BB, for example. Further, the depth or size is conceivably set large enough to facilitate maintenance of a posture of the image display device 10 when the image display device 10 is affixed.

In the virtual image display device 400 of the exemplary embodiment as well, with achieving miniaturization or thinning, and with providing power to forming an image having a wide angle of view, it is possible to guide the image light by the light-guiding portion LG in accordance with a widening of the angle of view between the image display device 10 and the second lens L2 of the enlargement optical system 20. In particular, in the exemplary embodiment, the embedding portion BB enables easy and reliable attachment of the image display device 10 and the enlargement optical system 20 from the viewpoint of maintaining the posture of each component and the like.

Modified examples will be described below with reference to FIG. 12 and the like.

Figure 12:
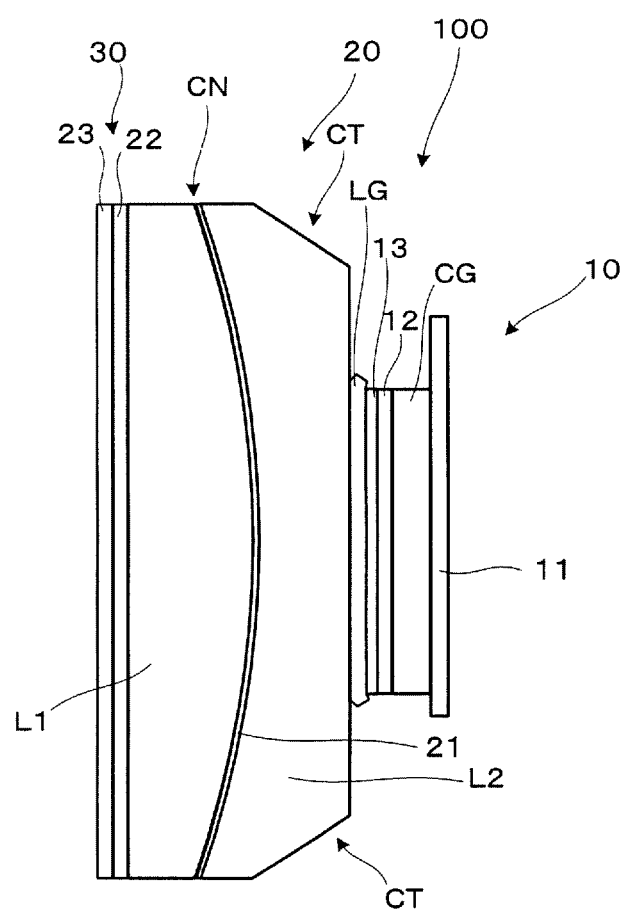
FIG. 12 is a conceptual side view illustrating an optical system constituting a virtual image display device of modified example.
Figure 13:
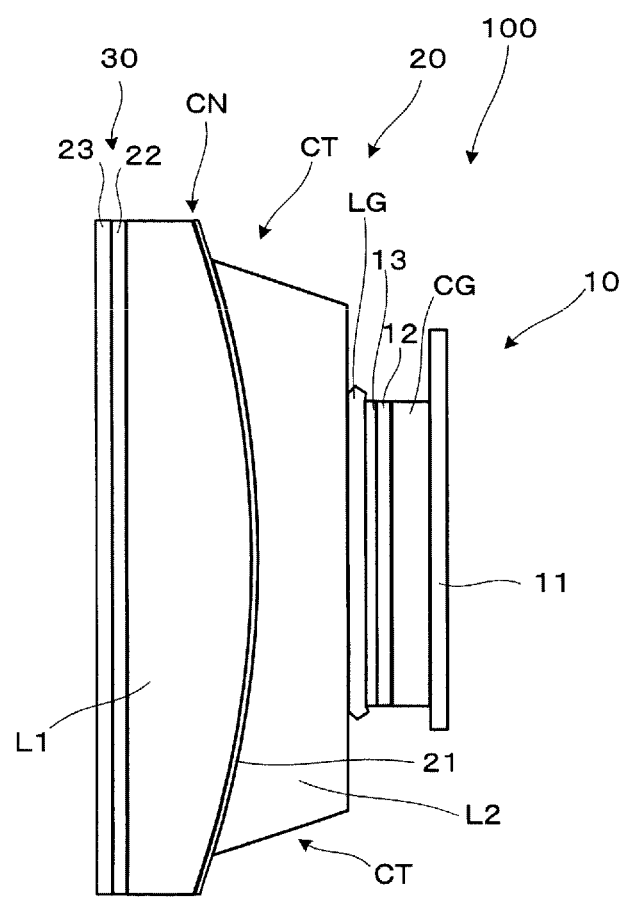
FIG. 13 is a conceptual side view illustrating the optical system constituting a virtual image display device of another modified example.

First, FIG. 12 is a diagram illustrating a virtual image display device of a modified example, and is a conceptual side view of the virtual image display device. In the modified example, a cutout portion CT is provided on the second lens L2. For example, as illustrated in FIG. 4 and the like, in the exemplary embodiment, a width of a pencil of rays of the image light GL is the widest at the first lens L1, and is relatively narrow at the second lens L2. Accordingly, for example, as in the illustration, by cutting out part of a portion of the second lens L2 which is outside the optical path of the image light GL and is unlikely to cause stray light or the like, the second lens L2 can be reduced in weight. Note that, various shapes can be considered for the cutout portion CT, and for example, as in another modified example illustrated in FIG. 13, a cutting method in which part of the half mirror 21 is exposed is also conceivable, as long as functions of other members can be secured. Note that, in this case, for example, configuring the half mirror 21 with a metal film is conceivable.

Figure 14:
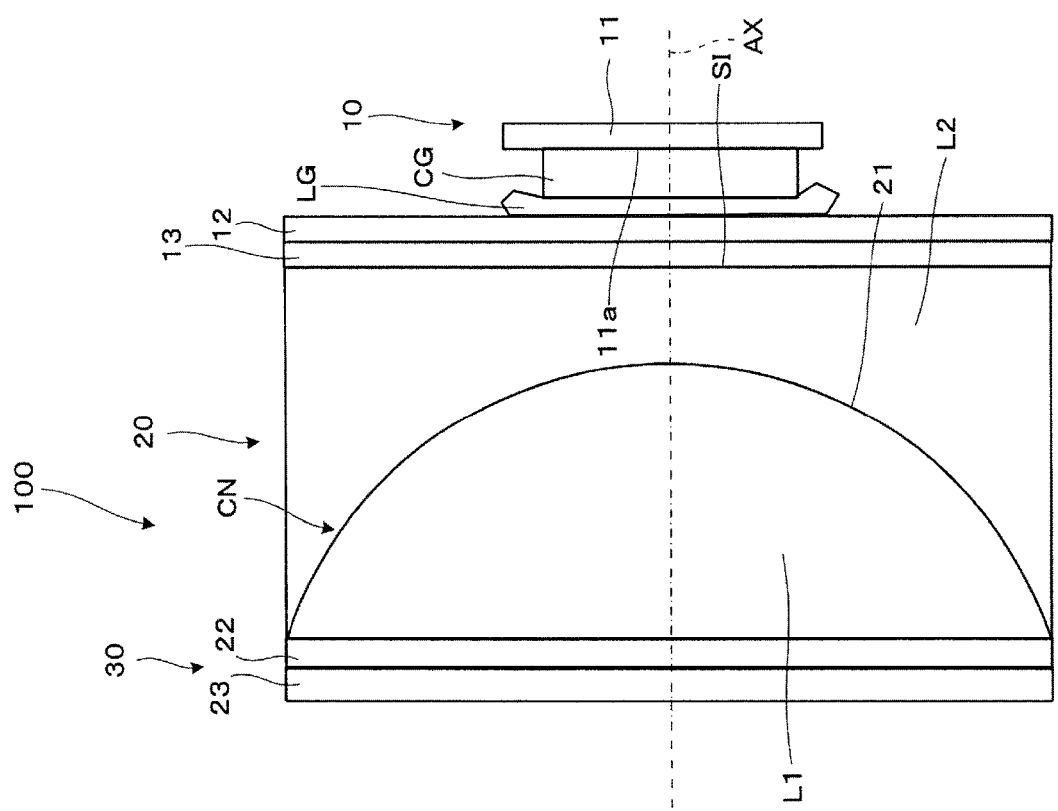
FIG. 14 is a side cross-sectional view for conceptually explaining a virtual image display device of yet another modified example.

Additionally, in the above description, it is configured such that the polarization plate 12 and the incident side polarization conversion member 13 are provided on the image display device 10 side, but for example, as illustrated in FIG. 14, a configuration in which the polarization plate 12 and the incident side polarization conversion member 13 are provided on the enlargement optical system 20 side may be adopted.

Others

Thus far, the present disclosure has been described based on some exemplary embodiments. Note that, however, the present disclosure is not limited to the above-described exemplary embodiments, and can be embodied in various aspects without departing from the spirit and scope of the present disclosure.

First, each of the first lens L1 and the second lens L2 is a glass lens in First Exemplary Embodiment described above, and depending on requirements or the like, a resin lens is also applicable and, for example, it is also conceivable that each of a resin lens with zero birefringence or a resin lens with low birefringence (that is, with orientation birefringence±0.01 or less, or a resin lens with a photoelastic constant 10 [10-12/Pa] or less) is used for the configuration to make the birefringence unlikely to occur. For example, in the virtual image display device 400 illustrated in FIG. 10 and the like as Fourth Exemplary Embodiment, it is conceivable that the second lens L2 is a resin lens to form the embedding portion BB. Additionally, it is conceivable that the first lens L1 is also a resin lens.

Further, the light-guiding portion LG is an adhesion portion formed by solidifying an adhesive provided in a layer form in the above description, but the light-guiding portion LG is not limited thereto. For example, a member having sufficiently high optical transparency but not having adhesiveness may be provided while being closely adhered between the image display device 10 and the second lens L2. For example, the light-guiding portion LG may be formed by grease, oil, or the like. In this case, various methods for providing a structure for keeping the grease, the oil, or the like between the image display device 10 and the second lens L2 can be applied.

Further, it is also conceivable to provide a structure such as an optical flat surface between the image display device 10 and the second lens L2 as the light-guiding portion LG, and to utilize a transparent tape as long as the accuracy in light transmission can be maintained.

Further, the image display device 10 includes, for example, a light-emitting type element (OLED) such as an organic EL in the above description, but in this case, for example, a device that emits circularly polarized image light may be adopted, and the polarization plate or the quarter wavelength plate may be omitted.

Additionally, generation of ghost light or the like may further be suppressed, by appropriately providing AR coating on a lens surface of each lens.

The techniques of the present disclosure may be employed in what is called a closed-type (not a see-through type) virtual image display device that makes only image light visually recognized. In addition, the techniques of the present disclosure may also be employed in a device enabling an observer to visually recognize or observe an external world image in a see-through manner, may be applied to what is called a video see-through product configured by a display device and an image device.

Additionally, the techniques of the present disclosure is applicable to a binocular type hand held display or the like.

Further, in the above description, as for a portion on which the half mirror 21 configured with the semi-reflective and semi-transmissive film that transmits part of image light and reflects another part is provided, for example, it is also conceivable that a function equivalent to an action by the half mirror 21 is obtained by providing an optical function surface such as a diffraction element, e.g., a volume hologram, instead of the half mirror.

Additionally, in the above description, the light-emitting surface on the front-of-eye side and the light incident surface to which the image light is incident are the light-emitting plane SE and the light incident plane SI, respectively, that is, both are flat surfaces, but it is conceivable that these surfaces are curved surfaces.

As described above, a virtual image display device according to an aspect of the present disclosure includes an image element configured to display an image, a first lens disposed in an extraction position of image light and including, at the image element side thereof, a convex surface, a second lens disposed further toward the image element side than the first lens and including a concave surface bonded to the convex surface of the first lens, a half mirror provided in a bonding portion for bonding together the convex surface and the concave surface, a transmission/reflection selection member provided at a light emitting side of the first lens and configured to selectively perform transmission or reflection of the light, depending on a polarization state of the light, and a light-guiding portion keeping close contact between the image element and the second lens and configured to guide the image light.

In the virtual image display device described above, with the first lens and the second lens being bonded together, and the half mirror being provided in the bonding portion between the convex surface and the concave surface to achieve miniaturization or thinning, and with power being provided to form an image having a wide angle of view, it is possible to guide the image light by the light-guiding portion in accordance with a widening of the angle of view between the image element and the second lens.

According to a specific aspect of the present disclosure, the light-guiding portion is an adhesion portion configured to adhere the image element to the second lens. In this case, the second lens can be positioned and fixed relative to the image element while forming the light-guiding portion to be closely adhered by the adhesion portion.

According to another aspect of the present disclosure, the virtual image display device includes an adhesive escape portion configured to cause a portion of an adhesive, which is to serve as the adhesive portion, to escape. In this case, the excess of adhesive to serve as the adhesive portion can escape.

According to yet another aspect of the present disclosure, the virtual image display device further includes a shielding portion additionally provided along a periphery of the light-guiding portion. In this case, the effect of unintentional light leakage can be suppressed by the shielding portion.

According to yet another aspect of the present disclosure, the virtual image display device further includes an image element positioning portion configured to position the image element relative to the second lens. In this case, the image element can be positioned relative to the second lens.

According to yet another aspect of the present disclosure, the second lens includes an embedding portion configured to embed the image element. In this case, reliable attachment between the second lens and the image element is possible.

According to yet another aspect of the present disclosure, the image element includes a deflecting member configured to deflect a light emission direction in accordance with an inclination angle of the principle ray. In this case, for example, a brightness of the image can be secured by deflecting the light emitted from the image element outward relative to the center, for example.

According to yet another aspect of the present disclosure, a refractive index of the light-guiding portion is greater than or equal to 1.3. In this case, an appropriate value is selected from the perspective of achieving attachment performance, such as adhesiveness of the light-guiding portion, practicality, and the like, and at the same time maintaining in securing the guiding of the image light in accordance with a widening of an angle of view.

According to yet another aspect of the present disclosure, the convex surface of the first lens and the concave surface of the second lens are spherical surfaces. In this case, the lens surfaces are the spherical surface lenses, and thus a more highly refractive material can be applied.

According to yet another aspect of the present disclosure, a size of an image display area of the image element is smaller than a size of an optical surface of the second lens. In this case, the size of the image element as well as the overall device can be reduced.

According to yet another aspect of the present disclosure, the image element is a micro display having an image display area with one side having a length of less than or equal to 2.5 inches. In this case, the size of the image element as well as the overall device can be reduced.

What is claimed is:

1. A virtual image display device comprising:
   an image element that emits an image light;
   a first lens that includes:
     a first emitting portion emitting the image light, and
     a first incident portion in which the image light is incident, the first incident portion having a convex surface that projects toward the image element;
   a second lens that is disposed between the image element and the first lens in an optical path and that includes:
     a second emitting portion emitting the image light, having a concave surface that is bonded with the first incident portion of the first lens, and including a half mirror along the concave surface, and
     a second incident portion in which the image light is incident;
   a transmission/reflection selection member that is provided along the first emitting portion of the first lens and that is configured to selectively perform transmission or reflection of the image light depending on a polarization state of the image light; and
   a light-guiding portion that guides the image light and that keeps close contact between the image element and the second incident portion of the second lens; and
   a shielding portion that is provided along a periphery of the light-guiding portion, wherein:
     the light-guiding portion is an adhesive that has an optical transparency,
     the image element emits the image light to the second incident portion of the second lens via the light-guiding portion,
     the second incident portion of the second lens has an embedding portion, and
     the embedding portion includes:
       a bottom surface that contacts the light-guiding portion and the shielding portion, and
       a positioning portion that contacts the image element.

2. The virtual image display device according to claim 1, comprising an optical case configured to have an adhesive escape portion that causes a portion of an adhesive, which is to serve as the light-guiding portion, to escape.

3. The virtual image display device according to claim 1, wherein the image element includes a deflecting member configured to deflect a light emission direction in accordance with an inclination angle of a principal ray.

4. The virtual image display device according to claim 1, wherein a refractive index of the light-guiding portion is greater than or equal to 1.3.

5. The virtual image display device according to claim 1, wherein the convex surface of the first lens and the concave surface of the second lens are spherical surfaces.

6. The virtual image display device according to claim 1, wherein a size of an image display area of the image element is smaller than a size of an optical surface of the second lens.

7. The virtual image display device according to claim 6, wherein the image element is a micro display having an image display area including one side having a length of less than or equal to 2.5 inches.

8. The virtual image display device according to claim 1, wherein keeping close contact means that no air layer, which would impact the guiding of the image light, is formed between the light-guiding portion and the image element.

9. The virtual image display device according to claim 1, wherein the light-guiding portion is directly connected to an incident side polarization conversion member of the image element.

\* \* \* \* \*